UNITED STATES PATENT OFFICE.

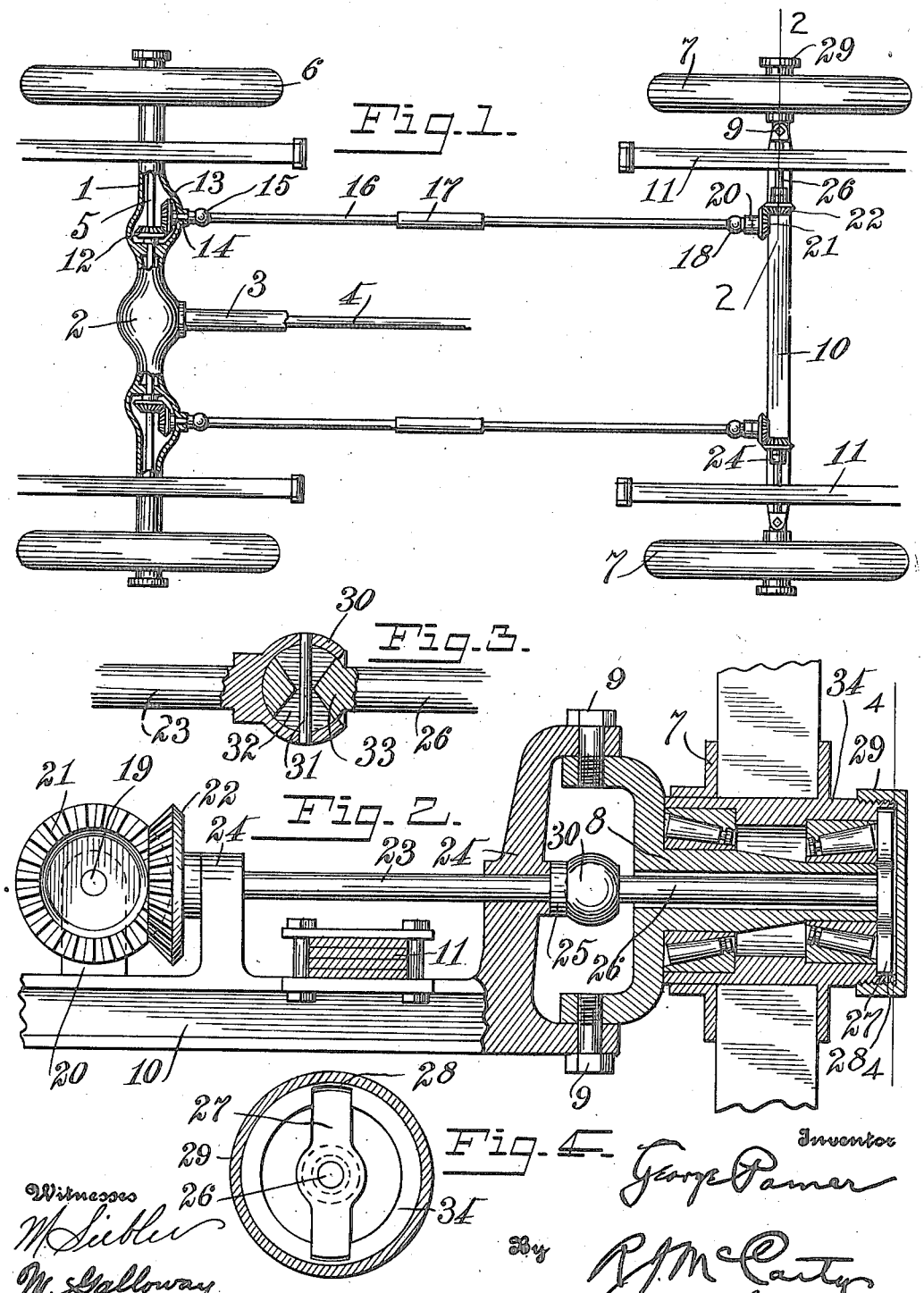

GEORGE PAMER, OF DAYTON, OHIO.

DRIVING-GEAR FOR AUTOMOBILES.

1,164,206.  Specification of Letters Patent.  Patented Dec. 14, 1915.

Application filed September 16, 1914. Serial No. 861,943.

*To all whom it may concern:*

Be it known that I, GEORGE PAMER, a subject of the Emperor of Austria-Hungary, residing at Dayton, in the county of Montgomery and State of Ohio, have invented certain new and useful Improvements in Driving-Gears for Automobiles; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to new and useful improvements in driving mechanism for automobiles.

The object of the invention is to provide a simple and efficient driving means which affords a direct connection between the axles of the front and rear wheels of the vehicle as hereinafter described in connection with the accompanying drawings.

Referring to the accompanying drawings, Figure 1 is a top plan view of a portion of the chassis of an automobile showing my improvement applied thereto; Fig. 2 is an enlarged section on the line 2—2 of Fig. 1: Fig. 3 is an enlarged detail view of one of the universal joints; and Fig. 4 is a section on the line 4—4 of Fig. 2.

In the specification and drawings, similar reference characters indicate corresponding parts.

Referring more particularly to the drawings, 1 represents a rear axle provided with a differential gear casing 2. Extending from the differential gear casing is a casing 3 through which a transmission shaft 4 extends. The shaft 4 is connected to any well known form of transmission gear (not shown) which receives power from the engine in a well known manner. The differential gear within the casing 2 is connected to the rear shaft 5 in a well known manner which in turn is connected to the rear wheels 6 mounted on the rear axle 1. The front wheels 7 are mounted on hollow axles 8 which are pivoted at 9 to the front axle 10. The axles 1 and 10 are connected to the frame of the chassis (not shown) by springs 11 in a well known manner. The front wheels 7 are driven from the rear shaft 5 and, consequently, through the same differential and transmission gears by the following means. Mounted on the rear shaft 5 are beveled gears 12 which lie away from the differential gearing and mesh with similar gears 13 mounted on stud shafts 14 journaled in the rear axle 1. The stud shafts 14 are connected to universal joints 15 which are in turn connected to one end of horizontal parallel transmission shafts 16 provided with telescopic connections 17. The ends of the shafts 16 opposite the universal joints 15 are provided with universal joints 18 which in turn are connected to suitable stud shafts 19, journaled in bearings 20 extending from the front axle 10. The stud shafts 14 and 19 are in horizontal alinement which arrangement permits the connection between said stud shafts to be of the simplest form possible, to-wit, the straight or parallel shafts 16. Mounted on the stud shafts 19 are beveled gears 21 in mesh with similar beveled gears 22 mounted on the inner ends of shafts 23 journaled in bearings 24. The outer ends of the shafts 23 are connected to universal joints 25 which are in alinement with the pivots 9. The construction of the universal joints 25 is shown in detail in Fig. 3 and consists of an outer globular member 30 provided with a pin 31 which extends through a double wedge-shaped slot 32 in a ball member 33. The construction of the universal joints 18 are identical with those of 25. The universal joints 25 are also connected to shafts 26 which extend through the hollow axles 8. The outer ends of the shafts 26 are connected to the hubs 34 of the front wheels 7 by a cross member 27 which rests in suitable recesses 28 in said hubs. The cross members 27 are held within the recesses 28 by hub caps 29. The rotation of the shafts 26 is transmitted to the front wheels 7 by the cross members 27. It will be seen that by thus constructing an automobile driving gear the front wheels are driven from the rear shaft and require only one transmission and one differential gear. The utilization of the universal joints 15 and the telescopic connections 17 permit the wheels to move independently relatively to the frame of the chassis. And, further, the gear connections between the front and rear axles are direct and of the simplest character.

Having described my invention, I claim.

A vehicle drive gear of the character specified, comprising in combination, a casing which receives rear axles and differential gearing connected to said axles, wheels connected to said axles, a transmission shaft extending from the source of power to said differential gearing, transmission gears mounted on said axles away from the differential gearing, rear horizontal and parallel stud shafts having gears thereon which mesh with the transmission gears on said axles, a front axle, hollow axles pivoted to said front axle, wheels mounted on said hollow axles, shafts extending through said hollow axles and connected to said wheels, universal joints in alinement with the pivots of said hollow axles, horizontal parallel front stud shafts in alinement with the rear horizontal parallel stud shafts, shafts connecting the front and rear stud shafts, and transmission gears between said front stud shafts and the universal joints connected to the shafts extending through said hollow axles, substantially as described.

In testimony whereof I affix my signature, in presence of two witnesses.

GEORGE PAMER.

Witnesses:
MELLIE GALLOWAY,
MATTHEW SIEBLER.